(12) United States Patent
Despatie et al.

(10) Patent No.: US 6,362,982 B1
(45) Date of Patent: Mar. 26, 2002

(54) FAULT TOLERANT AND CONVERSION EFFICIENT POWER CONVERTER

(75) Inventors: Claude Despatie, Dollard-des-Ormeaux; George Hedrei, Montreal, both of (CA)

(73) Assignee: Transfab Transformer Inc., Quebec (CA)

( * ) Notice: Subject to any disclaimer, the term of this patent is extended or adjusted under 35 U.S.C. 154(b) by 0 days.

(21) Appl. No.: 09/664,642

(22) Filed: Sep. 19, 2000

(51) Int. Cl.⁷ .................. H02H 7/122; H02M 7/68; H02M 7/537
(52) U.S. Cl. .............. 363/56.09; 363/97; 363/131; 363/16
(58) Field of Search ............... 363/16, 56.01, 363/56.09, 56.11, 57, 97, 131

(56) References Cited

U.S. PATENT DOCUMENTS

| | | | |
|---|---|---|---|
| 4,279,011 A | 7/1981 | Nilssen | 363/133 |
| 4,307,353 A | 12/1981 | Nilssen | 331/113 A |
| 4,506,318 A | 3/1985 | Nilssen | 363/132 |
| 5,036,253 A | 7/1991 | Nilssen | 315/151 |
| 5,083,255 A | 1/1992 | Nilssen | 363/132 |
| 5,099,407 A * | 3/1992 | Thorne | 363/37 |
| 5,144,202 A | 9/1992 | Nilssen | 315/151 |
| 5,463,307 A | 10/1995 | Rosenberg | 323/300 |
| 5,864,211 A * | 1/1999 | Kiermeier | 315/127 |
| 6,144,568 A * | 11/2000 | Franck et al. | 363/39 |
| 6,147,457 A * | 11/2000 | Lohn et al. | 315/209 R |
| 6,157,551 A * | 12/2000 | Barak et al. | 363/37 |

FOREIGN PATENT DOCUMENTS

GB  2193057 A  *  1/1988  .......... H02M/5/458

* cited by examiner

Primary Examiner—Bao Q. Vu
(74) Attorney, Agent, or Firm—Olson & Heirl, Ltd.

(57) ABSTRACT

A power converter with an enhanced power conversion factor interfaces with electrical utility alternating current (AC) power sources to drive low voltage electrical loads. A high frequency drive signal is provided by an oscillating power driver stage. Enhanced power conversion efficiencies are achieved using an uninterrupted wave operation of the high frequency oscillating power driver stage used to effect power conversion. Components of the power converter are protected by suppressing the oscillation of the oscillating power driver stage for as long as electrical fault conditions persist. The advantages include power savings, an extended life of power converter components, reduced heat output and reduced stress on power converter components during electrical faults.

15 Claims, 3 Drawing Sheets

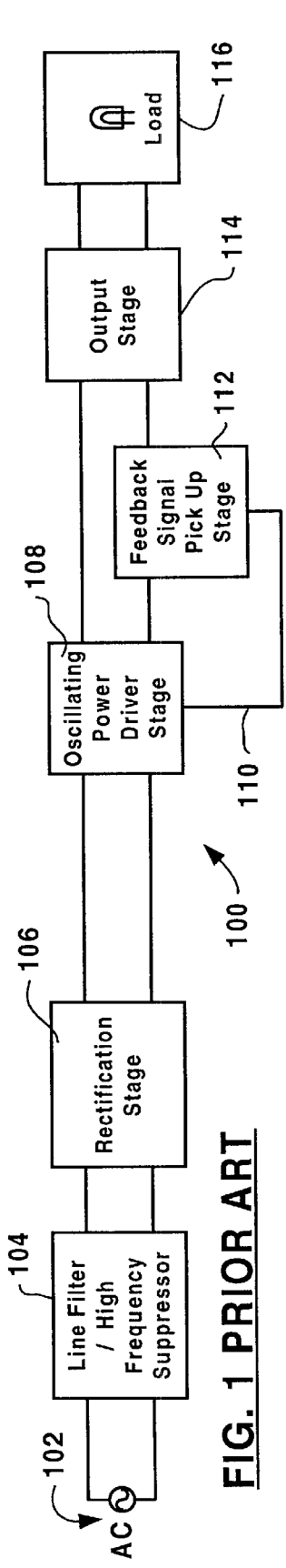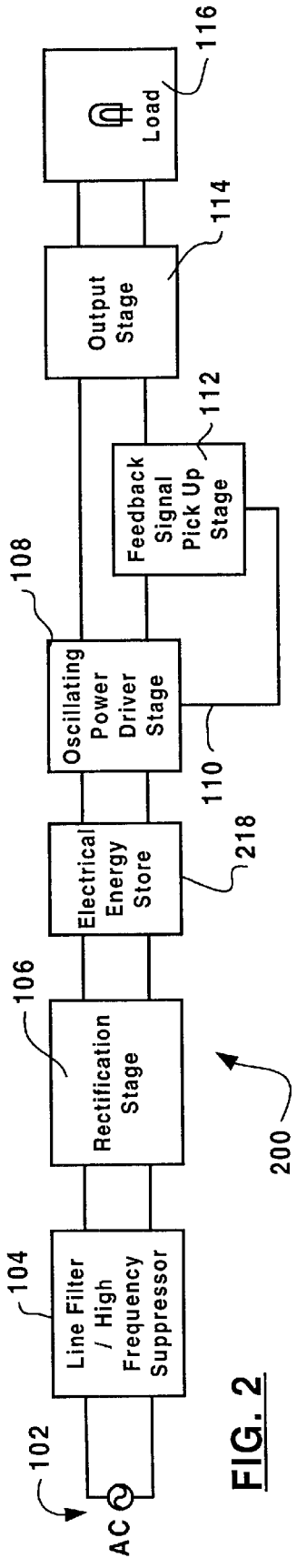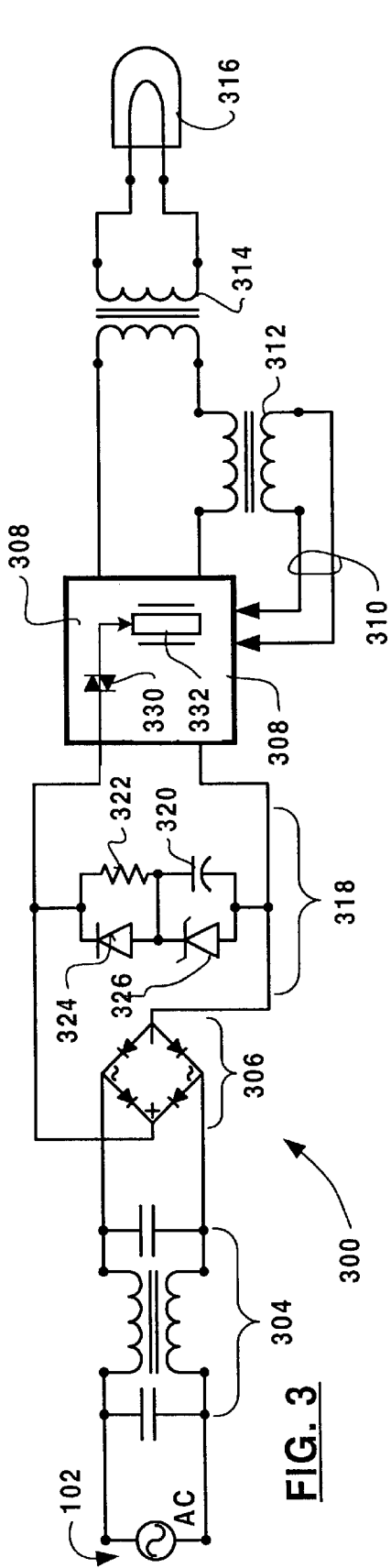

FAULT TOLERANT AND CONVERSION EFFICIENT POWER CONVERTER

CROSS-REFERENCE TO RELATED APPLICATIONS

This is the first application filed for the present invention.

TECHNICAL FIELD

The invention relates to power conversion and, in particular, to methods and apparatus for delivering electrical power to low voltage electrical loads with an enhanced power conversion efficiency.

BACKGROUND OF THE INVENTION

When using power converters for powering electrical loads, such as low-voltage incandescent lamps, excessive heating of power converter components is common due to inefficiencies in power conversion. An exemplary prior art power converter for a low-voltage incandescent lamp is taught in U.S. Pat. No. 5,036,253 that issued on Jul. 30, 1991 to Nilssen. The power converter is adapted to be driven from an electrical utility outlet that provides 60 Hz, alternating current (AC). The power converter provides at an output, a relatively high-frequency (30 kHz) substantially squarewave signal. The output signal is generated by an oscillating power driver stage of the power converter that is driven by a rectified AC input voltage derived via full-wave rectification of the 60 Hz utility power voltage. The oscillating power driver stage is of a type that has to be triggered into oscillation. However, once triggered, it will continue to oscillate, but only for as long as the instantaneous voltage magnitude of the rectified AC input exceeds minimum oscillation voltage level. The rectified AC input voltage falls to zero magnitude at a rate of 120 Hz. The oscillating power driver stage stops oscillating with each such zero level dip, as the rectified AC input voltage drops below the minimum oscillation voltage level. The oscillating power driver stage has to be re-triggered after each rectified AC voltage dip. Triggering is accomplished by a diac. The oscillating power driver stage is triggered into oscillation only after the rectified AC input voltage has risen above a turn on voltage of the diac (about 32V).

The output modulated envelope of conventional power converters is characterized by a discontinuous sinusoidal wave envelope. This discontinuity is reflected back into the utility power lines as a current drawn from the utility power lines, distorting the sinusoidal wave variation thereof. The result is that the power conversion factor and thus the efficiency of the power converter is reduced.

FIG. 1 illustrates a prior art power converter 100 supplied with input power, such as AC electrical utility power 102. An optional input stage 104 filters the utility power to suppress transients. The optional input stage 104 may also be adapted to suppress high frequency components reflected back from the power converter 100. A rectification stage 106 is used to convert the AC input power to rectified AC input power. The oscillating power driver stage 108 is supplied with the rectified AC input power to generate a high frequency substantially squarewave output. The oscillation of the oscillating power driver stage 108 is sustained by an oscillation feedback signal 110 derived from the high frequency squarewave output using a feedback signal pickup stage 112. The high frequency squarewave output is further conditioned by an output stage 114 before being applied to an electrical load 116.

If an electrical fault occurs, conventional protection circuits of re-triggerable power converters prevent the diac from triggering the oscillation. Once the oscillating power driver stage 108 is oscillating and an electrical fault is detected, the oscillating power stage 108 supplies power into the electrical fault until the rectified AC input voltage drops below the minimum oscillation voltage level required to stop the oscillation. Consequently, for a period of time conventional power converters will operate into an electrical fault condition, thus stressing the components of those power converters.

Conventional fault protection circuits are constructed to delay for a period of time before attempting to restart oscillation after a fault occurs. If the electrical fault condition persists, the oscillating power driver stage 108 is triggered into oscillation and operates into the electrical fault condition until the rectified AC input voltage again drops below the minimum oscillation voltage level, inducing further desirable stress on power converter components, and potentially leading to a build-up of heat, power loss and poor power conversion efficiency.

There therefore exists a need to enhance power conversion efficiency of low-voltage power converters, and provide a more effective fault protection mechanism to ensure that power converter components are not unduly stressed by a fault condition.

SUMMARY OF THE INVENTION

It is therefore an object of the invention to provide a power converter that delivers stored energy to an oscillating power driver stage during periods of low input voltage from a rectified alternating current input.

It is another object of the invention to suppress power delivery to an electrical load by the power converter in the event of a detected electrical fault.

It is a further object of the invention to suppress oscillation of an oscillating power driver stage of the power converter on detection of an electrical fault.

It is an further object of the invention to suppress an oscillation feedback signal driving an oscillating power driver stage of the power converter on detection of an electrical fault.

In accordance with the invention, there is therefore provided a method of supplying electrical power to an oscillating power driver stage of a power converter. The method comprises a first step of accumulating electrical energy in an electrical energy store during periods of high input voltage from a rectified alternating current (AC) input. In a second step, power is supplied from the energy store to the oscillating power driver stage during periods of low input voltage from the rectified AC input, so that power is continuously supplied to the oscillating power driver stage to enable uninterrupted oscillation of the power converter while the AC input voltage is supplied to the power converter.

The method further comprises a step of accumulating electrical energy in the energy store to an extent required to provide power to the oscillating power driver stage during a duration of low input voltage from the rectified AC input. The extent to which the energy is accumulated ensures minimal power drain to enhance a power conversion factor of the power converter. Alternatively, the method further comprises a step of charging the energy store at a controlled rate to charge the energy store to an extent required to provide power to the oscillating power driver stage during the periods of low input voltage from the rectified AC input. The controlled rate at which the energy store is charged ensures minimal power drain to enhance a power conversion factor of the power converter.

In accordance with a second aspect of the invention, there is provided a power converter for supplying electrical power to an electrical load. The power converter comprises an electrical energy store charged during periods of high input voltage from a rectified AC input to supply at least a portion of the stored charge to an oscillating power driver stage of the power converter during periods of low input voltage from the rectified AC input. The energy store preferably comprises a capacitor for storing electrical energy required to sustain oscillation of the oscillating power driver stage during periods of low input voltage of the rectified AC input. The capacitor may have an energy storage capacity in excess of the electrical energy required to sustain oscillation of the oscillating power driver stage during periods of low input voltage of the rectified AC input. The power converter may also include a Zener diode coupled across terminals of the capacitor to control an upper limit on the amount of electrical energy stored by the capacitor to sustain oscillation of the oscillating power driver stage during periods of low input voltage from the rectified AC input, and to limit power drain to enhance the power conversion factor of the power converter. The power converter may further include a charging rate limiter to charge the energy store during periods of high input voltage from the rectified AC input at a charging rate selected to store an amount of electrical energy required to sustain oscillation of the oscillating power driver stage during periods of low input voltage of the rectified AC input. The charging rate limiter may comprise a resistor for limiting the current flow, for example. The power converter may also further comprise a diode coupled across the charging rate limiter to couple at least a proportion of the energy stored directly to the oscillating power driver stage during periods in which the voltage of the rectified AC input falls below that of the energy store to sustain uninterrupted oscillation of the oscillating power driver stage during periods of low input voltage from the rectified AC input.

In accordance with a third aspect of the invention, there is provided a method for suppressing the operation of a power converter supplying power to an electrical load to minimize power dissipation during detected electrical faults. The method comprises a first step of generating a fault signal on detecting the fault. A latch is activated in response to the generated fault signal. Activation of the latch suppresses an oscillation feedback signal that promotes the oscillating power driver stage into oscillation. The method further comprises a step of diverting current flow used to derive the oscillation feedback signal from an output of the oscillating power driver stage, the diversion being effected via an auxiliary transformer coil associated with the drive transformer.

In accordance with a fourth aspect of the invention, there is provided a fault protected power converter for suppressing oscillation of an oscillating power driver stage on detecting an electrical fault. The power converter comprises a fault detector providing a fault signal, a latch having a default inactive state and a promoted active state, the promoted active state providing a shutdown signal, and an auxiliary winding associated with a drive transformer providing an oscillation feedback signal to the oscillator power driver circuit. The auxiliary coil, when driven by the shutdown signal, diverts current flow used to derive the oscillation feedback signal from an output of the oscillating power driver stage during detected electrical faults.

The oscillating power driver stage may include the fault detection circuit. The oscillating power driver stage may further comprise a fault signal generation circuit.

Advantages of the invention include power savings, an extended service life for power converter components, reduced heat output in general, and reduced heat and surge stress on power converter components during electrical faults.

BRIEF DESCRIPTION OF THE DRAWINGS

Further features and advantages of the present invention will become apparent from the following detailed description, taken in combination with the appended drawings, in which:

FIG. 1 is a block diagram showing operational components of a prior art power converter for driving an electrical load;

FIG. 2 is a block diagram showing operational components of a power converter, in accordance with an exemplary embodiment of the invention for driving an electrical load;

FIG. 3 is a schematic diagram showing interconnected electrical components of a power converter in accordance with an implementation of the invention for driving an electrical load, the power converter having an enhanced power conversion factor;

It will be noted that throughout the appended drawings, like features are identified by like reference numerals.

DETAILED DESCRIPTION OF THE PREFERRED EMBODIMENT

Figure 4:
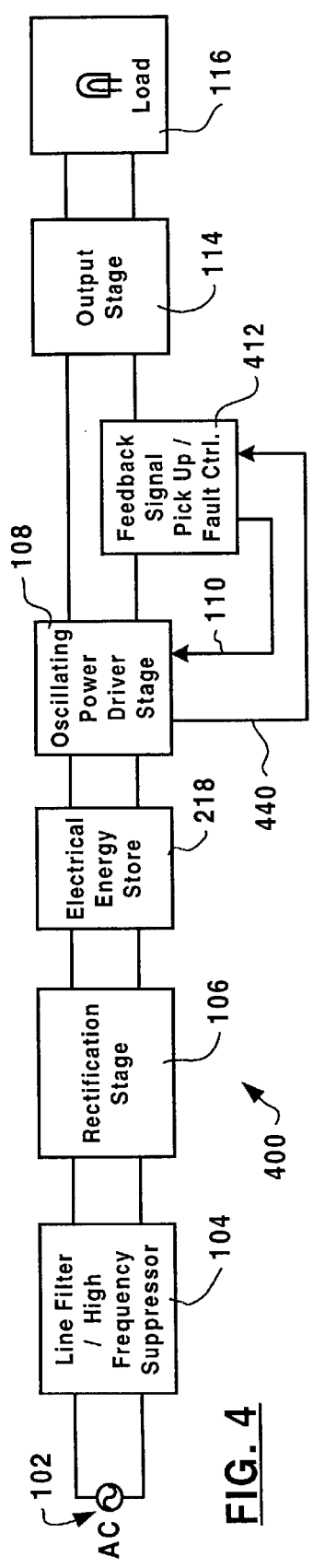
FIG. 4 is a block diagram showing operational components of a fault protected power converter in accordance with another exemplary embodiment of the invention for driving an electrical load.

The invention provides a high efficiency power converter for light-load applications, such as halogen lamps and the like. The power converter operates in an uninterrupted oscillation mode that conserves energy, and improves performance and reliability. A fault interrupt circuit further improves reliability by protecting converter components in the event of a load fault.

FIG. 2 is a block diagram showing operational components of a power converter 200 in accordance with an embodiment of the invention for driving an electrical load. The power converter 200 includes an electrical energy store 218. As the rectified AC input drops below the minimum oscillation voltage twice every cycle, the rectification stage output is coupled to the electrical energy store 218. The electrical energy store 218 supplies power to keep the oscillating power driver stage 108 operating during time periods in which the rectified AC input is too low to drive the oscillating power driver stage 108.

A simple electrical energy storage circuit can be implemented by connecting a capacitor with adequate storage capacity to the output of the rectification stage 106. A disadvantage of this option for implementation is that the capacitor would have to have a large capacity. A large capacitor would reduce the power conversion factor, and affect the efficiency of the power converter 200.

FIG. 3 is a schematic diagram showing, in accordance with an implementation of the invention, interconnected electrical components of a power converter 300 for driving an electrical load 316. The power converter 300 operates in a continuous oscillation mode to enhance power conversion efficiency. The power converter 300 typically operates at frequencies of 35KHz, but the invention is not limited to that frequency. A radio frequency (RF) filter 304 prevents high frequency components generated by the oscillating power driver stage 308 from reflecting back into the utility power lines to lower harmonic content of the utility power lines, thereby enhancing the power conversion factor. The AC input is full wave rectified by a bridge rectifier 306. The power converter 300 uses a diac 330 to trigger the oscillating power driver stage 308 into oscillation every cycle of the rectified AC input. On start up rectified AC input voltage must reach a diac turn on voltage of about 32V before triggering takes place. An oscillation feedback signal 310 provided by drive transformer 312 drives the oscillating power driver stage 318. The oscillating power driver stage 308 drives power transformer 314, which is interfaced to the electrical load 316.

When the rectified AC input voltage rises above that of an energy storage capacitor 320 of the electrical energy store 318, electrical energy flows into the capacitor 320. During this phase, a diode 324 is non conducting because it is reverse biased, and a resistor 322 channels electrical energy into the capacitor 320. The resistor 322 acts as a charge rate limiter to prevent the power conversion factor from deteriorating by limiting the current drawn. When the rectified AC input voltage falls below that of the energy storage capacitor 320, the diode 324 is forward biased and begins to conduct. Energy is provided to the oscillating power driver stage 308 from the capacitor 320 to sustain continuous oscillation thereof. The capacitor 320 is discharged while the rectified AC input voltage is too low to sustain oscillation of the oscillating power driver 308.

The continuous wave power converter has an output modulated envelope which has no discontinuities. The oscillating power driver stage 308 operates continuously, and the diac 330 is only used to start the oscillation at start up. Thus the power converter 300 draws a substantially sinusoidal wave current from the AC input 102 to enhance the power conversion factor, which significantly increases the efficiency of the power converter 300.

A Zener diode 326 may be connected across the energy storage capacitor 320 to prevent the voltage developed across the capacitor 320 from rising above a value required to provide energy to the oscillating power driver stage during low input power periods. A low voltage, high reliability capacitor 320 is preferably used to provide the energy storage. The capacitor voltage is clamped by the Zener diode 326 to a level well below that of the capacitor rating. Energy is delivered to the oscillating power driver stage 308 only when needed via the diode 324 and only when the rectified AC input voltage falls below the capacitor voltage. As such, the operational life of the capacitor 320 is prolonged, hence the reliability of the power converter 300 is increased.

By using a low voltage capacitor, the size of the capacitor may be relatively small to provide a compact power converter. Another novel benefit of this embodiment is its performance when connected to a dimmer switch. Electronic lighting dimmers generally are not adapted to drive capacitive loads. With the electrical energy store 218 delivering the required energy only during low input voltage periods of the rectified AC input, the dimmer only drives a capacitive load during those periods. Such periods last for a few milliseconds. Thus, a dimmer interfaces with the power converter 200 without creating instabilities, such as flickering.

FIG. 4 is a block diagram showing another exemplary embodiment of the invention in which a power converter 400 is fault protected. In the event of an electrical fault condition at the output of the power converter 400, a fault protection circuit is activated. The fault protection circuit is associated with the feedback signal pickup 412. The protection circuit is desirable because of the uninterrupted oscillation of the oscillating power driver stage 108. One way of suppressing the oscillation of the oscillating power driver stage 108, in the event of a detected fault, is to suppress the oscillation feedback signal 110. Suppression of the feedback signal can be effected at any time by asserting a fault signal 440 to activate the protection circuit.

Figure 5:
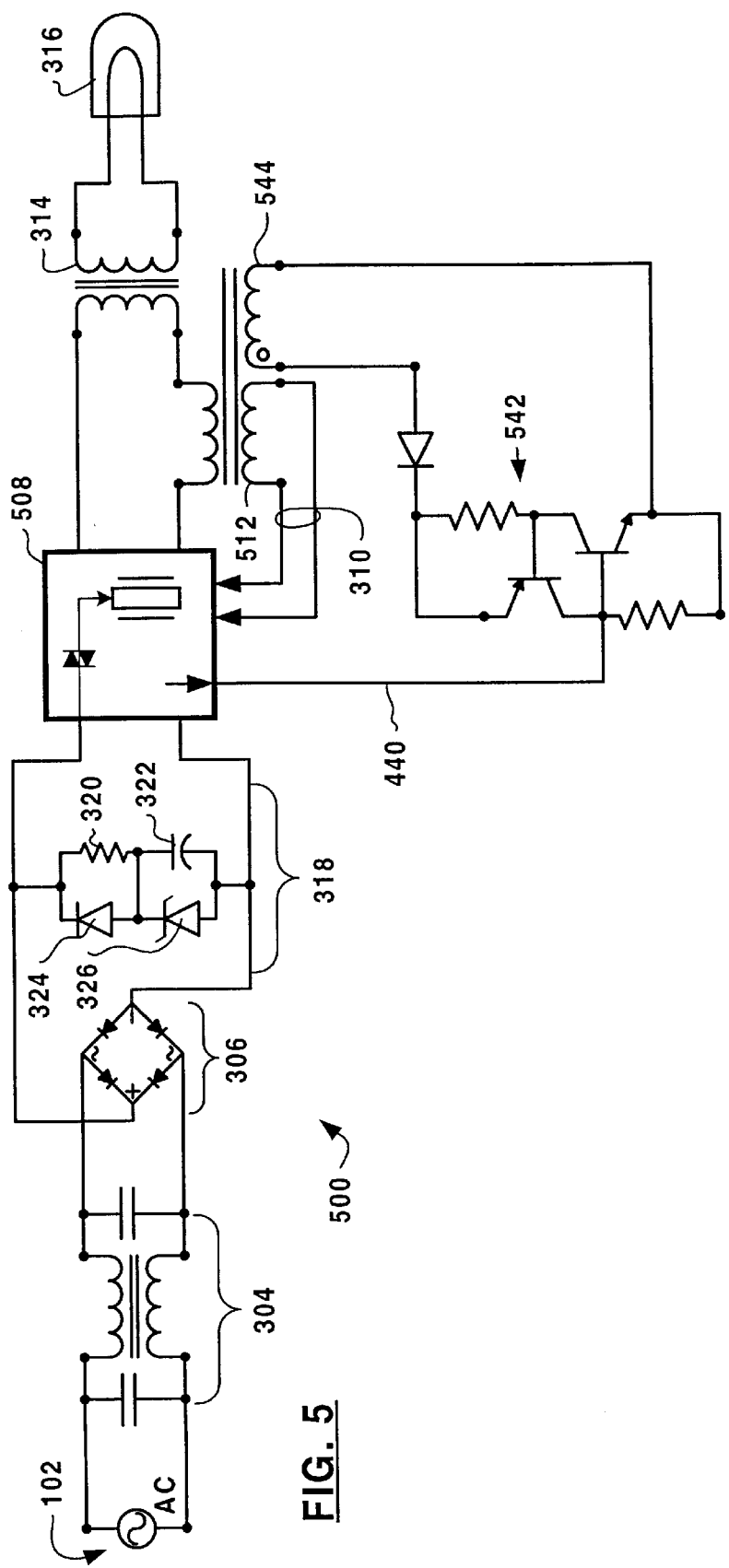
FIG. 5 is a schematic diagram showing interconnected electrical components of a fault protected power converter in accordance with an implementation of the invention for driving an electrical load.

FIG. 5 is a schematic diagram showing, interconnected electrical components of a fault protected power converter 500 for providing power to an electrical load. When an electrical fault is detected by the power converter 500, fault signal 440 is applied to a pair of bipolar transistors of a protection circuit configured as a latch 542. The latch 542 draws a current load down an auxiliary winding 544 associated with the drive transformer 512. The current drawn by the latch 542 is diverted from the oscillation feedback signal 310. As a result, the oscillating power driver stage 508 can no longer sustain oscillation and the power converter 500 shuts down. The power converter 500 will attempt to retrigger the oscillating power driver stage 508 into oscillation. If the electrical fault persists, the oscillating power driver 500 is unable to sustain oscillation. Thus the power converter 500 can be shut down very quickly at any time. This condition can persist indefinitely without damaging the power converter 500. If the electrical fault is cleared, a normal start cycle will occur by activating the diac 330 which triggers the oscillation and the power converter 500 will resume uninterrupted oscillation. Suppressing the operation of the power converter during detected electrical faults increases reliability of the power converter, reduces component heating and improves power converter efficiency.

Figure 6:
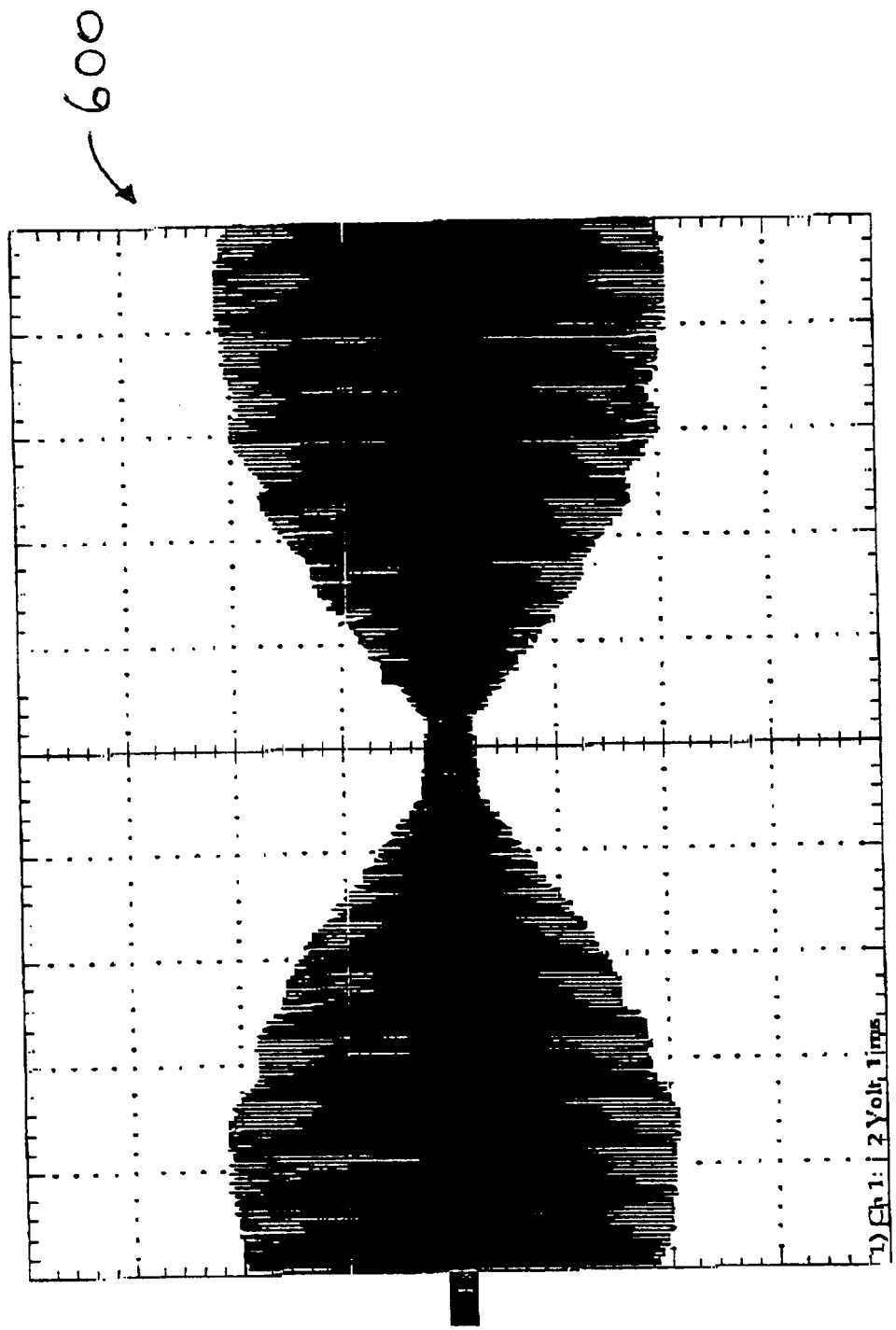
FIG. 6 is a waveform diagram of the output of a power converter in accordance with the invention.

FIG. 6 is a waveform diagram of the output of a power converter 200–500 in accordance with the invention the power converter 200–500 has an output modulated envelope 600 that has no breaks because the power oscillator operates without interruption. Thus the power converter 200–500 draws a substantially pure sine wave current from the AC source 102 (FIGS. 1–5) to provide a near perfect power factor that significantly increases the efficiency of the power converter.

The embodiments of the invention described above are intended to be exemplary only. The scope of the invention is therefore intended to be limited solely by the scope of the appended claims.

We claim:

1. A method of supplying electrical power to an oscillating power driver stage of a power converter, comprising steps of:
    a) accumulating electrical energy in an electrical energy store during periods of high input voltage from a rectified alternating current (AC) input; and
    b) supplying power from the energy store to the oscillating power driver stage during periods of low input voltage from the rectified AC input, so that power is continuously supplied to the oscillating power driver stage to enable uninterrupted oscillation of the power converter while the AC input voltage is supplied to the power converter.

2. A method as claimed in claim 1, wherein the method further comprises a step of accumulating electrical energy in the energy store to an extent required to provide power to the oscillating power driver stage during a duration of low input voltage from the rectified AC input, the extent to which the energy is accumulated ensuring minimal power drain to enhance a power conversion factor of the power converter.

3. A method as claimed in claim 1, wherein the method further comprises a step of charging the energy store at a controlled rate to charge the energy store to an extent required to provide power to the oscillating power driver stage during the periods of low input voltage from the rectified AC input, the controlled rate at which the energy store is charged ensuring minimal power drain to enhance a power Conversion factor of the power converter.

4. A power converter for supplying electrical power to an electrical load, the power converter comprising:
 a) an electrical energy store charged during periods of high input voltage from a rectified AC input to supply at least a portion of the stored charge to an oscillating power driver stage of the power converter during periods of low input voltage from the rectified AC input.

5. A power converter as claimed in claim 4, wherein the energy store comprises a capacitor for storing electrical energy required to sustain oscillation of the oscillating power driver stage during periods of low input voltage of the rectified AC input.

6. A power converter as claimed in claim 5, wherein the capacitor has an energy storage capacity in excess of the electrical energy required to sustain oscillation of the oscillating power driver stage during periods of low input voltage of the rectified AC input.

7. A power converter as claimed in claim 6, wherein the power converter further comprises a Zener diode coupled across terminals of the capacitor to control an upper limit on the amount of electrical energy stored by the capacitor to sustain oscillation of the oscillating power driver stage during periods of low input voltage from the rectified AC input, and to limit power drain to enhance the power conversion factor of the power converter.

8. A power converter as claimed in claim 4, wherein the power converter further comprises a charging rate limiter to charge the energy store during periods of high input voltage from the rectified AC input at a charging rate selected to store an amount of electrical energy required to sustain oscillation of the oscillating power driver stage during periods of low input voltage of the rectified AC input.

9. A power converter as claimed in claim 8, wherein the charging rate limiter comprises a resistor for limiting current flow to the energy store during periods of high input voltage from the rectified AC input to store the amount of electrical energy required to sustain oscillation of the oscillating power driver stage during periods of low input voltage from the rectified AC input, to limit power drain to enhance the power conversion factor of the power converter.

10. A power converter as claimed in claim 8, wherein the power converter further comprises a diode coupled across the charging rate limiter to couple at least a proportion of the energy stored directly to the oscillating power driver stage during periods in which the voltage of the rectified AC input falls below that of the energy store to sustain uninterrupted oscillation of the oscillating power driver stage during periods of low input voltage from the rectified AC input.

11. A method for suppressing the operation of a power converter supplying power to an electrical load to minimize power dissipation during detected electrical faults, the method comprising steps of:
 a) generating a fault signal on detecting the fault;
 b) activating a latch in response to the generated fault signal; and
 c) drawing current through the latch to suppress an oscillation feedback signal that promotes the oscillating power driver stage into oscillation.

12. A method as claimed in claim 11, wherein the method further comprises a step of diverting current flow used to derive the oscillation feedback signal from an output of the oscillating power driver stage, the diverting being effected via an auxiliary transformer coil associated with the drive transformer.

13. A fault protected power converter for suppressing oscillation of an oscillating power driver stage on detecting an electrical fault, the power converter comprising:
 a) a fault detector for generating a fault signal when an electrical fault is detected;
 b) a latch having a default inactive state and a promoted active state entered when the fault signal is generated;
 c) an auxiliary winding associated with a drive transformer providing an oscillation feedback signal to the oscillator power driver stage, the auxiliary winding diverting current flow from the drive transformer when the latch is in the promoted active state, thereby suppressing oscillation of the oscillating power driver stage to achieve a reduction in power dissipation during detected electrical faults.

14. A power converter as claimed in claim 13, wherein the oscillating power driver stage further comprises a fault detection circuit.

15. A power converter as claimed in claim 13, wherein the oscillating power driver stage further comprises a fault signal generation circuit.

* * * * *